United States Patent [19]
Muraoka et al.

[11] Patent Number: 5,784,703
[45] Date of Patent: Jul. 21, 1998

[54] STORAGE SYSTEM HAVING LOGICAL SUBSYSTEMS CONFIGURED IN ACCORDANCE WITH EQUALLY DIVIDED STORAGE CAPACITIES, SPECIFIED ALLOTMENT RATES, DESIGNATED BOUNDARY POSITIONS OR DESIGNATED PHYSICAL SIZE

[75] Inventors: Kenji Muraoka; Minoru Yoshida, both of Odawara, Japan

[73] Assignee: Hitachi, Ltd., Tokyo, Japan

[21] Appl. No.: 16,394

[22] Filed: Feb. 11, 1993

[30] Foreign Application Priority Data

Feb. 12, 1992 [JP] Japan ..................... 4-025103

[51] Int. Cl.$^6$ ................................. G06F 12/06
[52] U.S. Cl. .................. 711/173; 711/170; 711/112
[58] Field of Search ................... 395/425, 325, 395/575, 828, 829, 497.01, 497.04, 439; 711/112, 170, 171, 173

[56] References Cited

U.S. PATENT DOCUMENTS

| | | | |
|---|---|---|---|
| 4,607,346 | 8/1986 | Hill | 711/170 |
| 5,148,432 | 9/1992 | Brant et al. | 395/182.05 |
| 5,148,540 | 9/1992 | Beardsley et al. | 395/182.03 |
| 5,379,417 | 1/1995 | Lui et al. | 364/481 |
| 5,568,629 | 10/1996 | Gentry et al. | 711/114 |

FOREIGN PATENT DOCUMENTS 2-239348(A)  9/1990  Japan .

OTHER PUBLICATIONS

"PC-MS DOS 4.0 for Hard Disk Users", David D. Busch, 1989, pp. 85-99.

*Primary Examiner*—Eddie P. Chan
*Assistant Examiner*—Kevin L. Ellis
*Attorney, Agent, or Firm*—Antonelli, Terry, Stout & Kraus, LLP

[57] ABSTRACT

A storage array system having a plurality of physical storage devices from and into which data are read and written by a host system, comprising a physical system configuration information table which stores configuration information of the plurality of physical storage devices therein; a logical system configuration information table which stores therein configuration information of a plurality of logical storage subsystems in the case where the plurality of physical storage devices have been divided into the logical storage subsystems; and a division designation device which effects at least one of a number of designations in compliance with a command received from the host system. The designations include an n-equal-part designation in which a total storage capacity of the physical storage devices is equally divided in n (an integer of at least 2) for the n logical storage subsystems, a divisional allotment rate designation in which the total storage capacity is divided in accordance with a specified number for division and specified rates of capacities to be allotted to the respective logical storage subsystems, and a physical boundary division designation in which the total storage capacity is divided in accordance with positions for the division specified in physical storage unit.

21 Claims, 9 Drawing Sheets

FIG.6

| 601a | 601b | 601c | 601d |
|---|---|---|---|
| DESIGNATION OF PHYSICAL SIZE | DESIGNATION OF DIVISION INTO n EQUAL PARTS | DESIGNATION OF DIVISIONAL ALLOTMENT RATIO | DESIGNATION OF PHYSICAL BOUNDARY-BASED DIVISION |
| LOGICAL DEVICE NO. (602) | NUMBER OF DIVIDED PARTS (604) | NUMBER OF DIVIDED PARTS | NUMBER OF DIVIDED PARTS (609) |
| PHYSICAL SIZE (603) | (605) | ALLOTMENT RATIO OF 1ST LOGICAL DEVICE | 1ST PHYSICAL BOUNDARY POSITION (610) |
| | (606) | ALLOTMENT RATIO OF 2ND LOGICAL DEVICE | 2ND PHYSICAL BOUNDARY POSITION (611) |
| | (607) | ALLOTMENT RATIO OF 3RD LOGICAL DEVICE | 3RD PHYSICAL BOUNDARY POSITION (612) |
| | (608) | ............ | ............ |

| | |
|---|---|
| NUMBER OF CONNECTED MAGNETIC DISKS | ~701 |
| NUMBER OF MAGNETIC DISK COLUMNS | ~702 |
| NUMBER OF MAGNETIC DISKS PER COLUMN | ~703 |
| CAPACITY OF EACH MAGNETIC DISK | ~704 |
| TOTAL PHYSICAL CAPACITY | ~705 |

| | | |
|---|---|---|
| 1ST LOGICAL DEVICE | CAPACITY | ~801 |
| 1ST LOGICAL DEVICE | START DRIVE NO. | ~802 |
| 1ST LOGICAL DEVICE | START LOGICAL BLOCK NO. | ~803 |
| 1ST LOGICAL DEVICE | END DRIVE NO. | ~804 |
| 1ST LOGICAL DEVICE | END LOGICAL BLOCK NO. | ~805 |
| 2ND LOGICAL DEVICE | CAPACITY | ~801 |
| 2ND LOGICAL DEVICE | START DRIVE NO. | ~802 |
| 2ND LOGICAL DEVICE | START LOGICAL BLOCK NO. | ~803 |
| 2ND LOGICAL DEVICE | END DRIVE NO. | ~804 |
| 2ND LOGICAL DEVICE | END LOGICAL BLOCK NO. | ~805 |
| 3RD LOGICAL DEVICE | CAPACITY | ~801 |

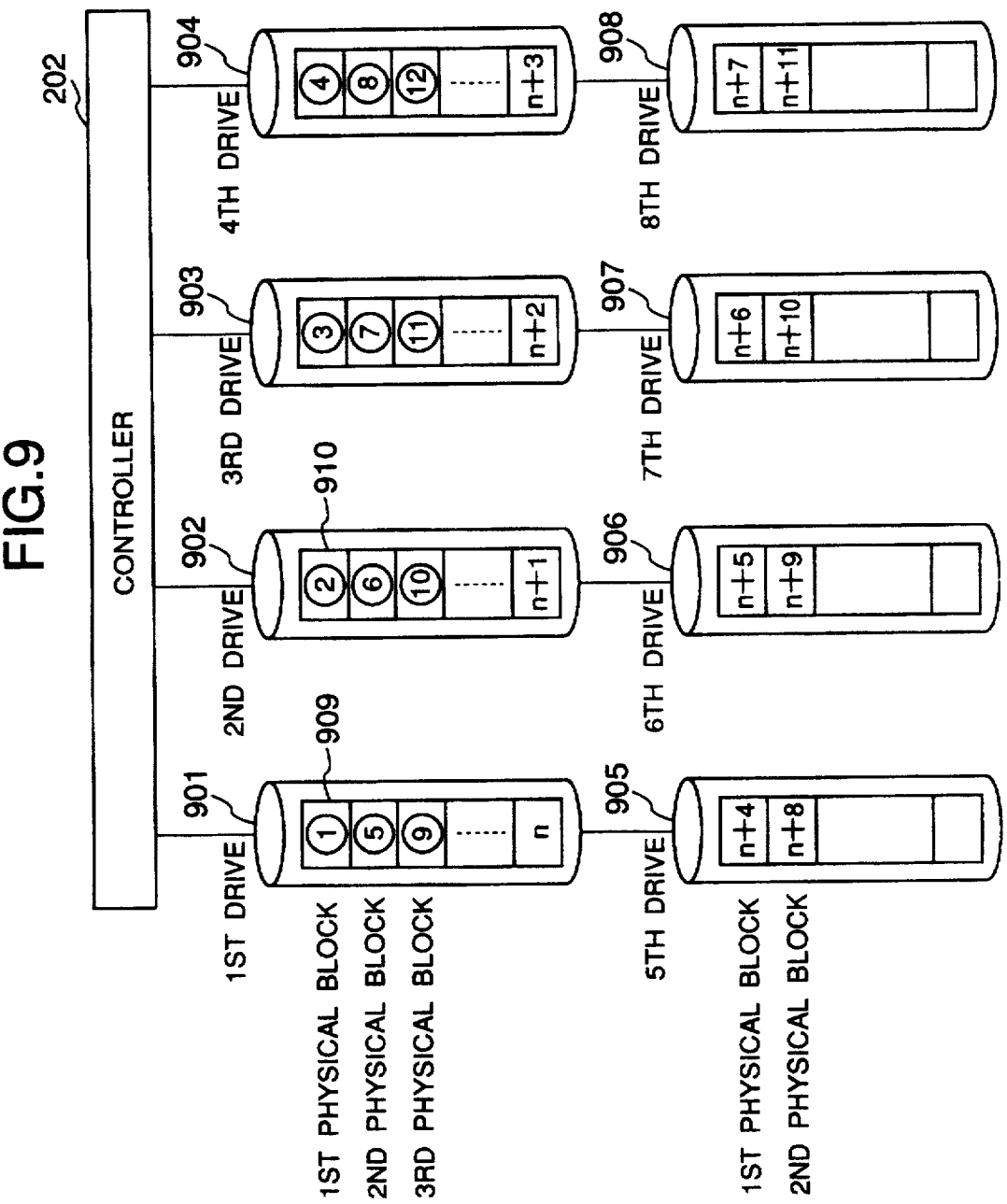

COMMAND

DATA (FOR DIVISION COMMAND)

1

STORAGE SYSTEM HAVING LOGICAL SUBSYSTEMS CONFIGURED IN ACCORDANCE WITH EQUALLY DIVIDED STORAGE CAPACITIES, SPECIFIED ALLOTMENT RATES, DESIGNATED BOUNDARY POSITIONS OR DESIGNATED PHYSICAL SIZE

BACKGROUND OF THE INVENTION

1. Field of the Invention

The present invention relates to a storage array system such as a disk array system. More particularly, it relates to a method of defining a plurality of logical devices or logical storage subsystems in a storage array system which has a plurality of physical storage devices and in which the logical devices in a configuration different from that of the physical storage devices can be apparently connected when viewed from a host system of the storage array system.

2. Description of the Prior Art

The official gazette of Japanese Patent Application Laid-open No. 236714/1990 discloses an arrayed disk drive mechanism system. With this system, a logical configuration can be flexibly controlled. In addition, the official gazette of Japanese Patent Application Laid-open No. 239348/1990 discloses an expedient which divides a single physical storage medium into a plurality of logical devices.

In the prior-art techniques, it is not considered to simplify a method of setting a logical device configuration in a storage array system, such as a disk array system, which has a plurality of storage media and in which a plurality of logical devices or logical storage subsystems configured differently from the physical configuration of the storage media can be apparently connected when viewed from a host system of the storage array system. Accordingly, the prior art has the problem that the designation of the logical device configuration is complicated.

Another problem is that in a case where information items on the logical system configuration have been lost due to the failure of a memory in which they are stored, data stored in the storage array system can no longer be read out properly.

SUMMARY OF THE INVENTION

An object of the present invention is to provide, in a storage system such as a disk array system being configured of a plurality of physical storage devices and being functionally adapted to be used in the form of two or more divided logical devices or logical storage subsystems, a storage array system in which an operator can designate a logical system configuration on the basis of only logical information without being conscious of the physical configuration.

Another object of the present invention is to provide a storage array system which can prevent logical system configuration information from being lost due to any hardware failure, the loss making it impossible to read out data recorded in the storage array system.

In one aspect of performance of the present invention, there is provided a storage array system having a plurality of physical storage devices, wherein a plurality of logical storage subsystems in a configuration differing from that of the plurality of physical storage devices can be apparently connected when viewed from a host system of the storage array system, comprising a physical configuration information table for storing configuration information of the plurality of physical storage devices therein; division designation means for effecting at least one of a number of designations in compliance with a command received from the host system, the designations including an n-equal-part designation in which a total storage capacity of the physical storage devices is equally divided by n (n being an integer of at least 2) for the n logical storage subsystems, a divisional allotment rate designation in which the total storage capacity is divided in accordance with a specified number for division and specified rates of capacities to be allotted to the respective logical storage subsystems formed by the division, and a physical boundary division designation in which the total storage capacity is divided in accordance with positions for the division specified in physical storage units; and a logical configuration information table for storing therein configuration information of the plurality of logical storage subsystems into which the plurality of physical storage devices have been divided by the division designation means.

The storage array system further comprises a memory which is backed up by a battery, wherein the physical configuration information table and the logical configuration information table are created in the battery-backed-up memory.

The storage array system further comprises a nonvolatile memory in addition to the battery-backed-up memory, wherein the contents of the logical configuration information table are also stored in the additional nonvolatile memory.

In operation, the present invention permits the storage array system to have the logical system configuration thereof (the configuration of the logical storage subsystems thereof) designated by the information of high level such as the "n-equal-part designation", "divisional allotment rate designation" or "physical boundary division designation", instead of information of physical level. The high-level information is automatically converted into the physical-level information within the storage array system, thereby defining the logical system configuration (that is, to set the contents of the logical system configuration table).

Moreover, in order to prevent the logical system configuration information items from being lost, these information items are retained in the different sorts of memories in dual fashion. Thus, even when it has become impossible to read out the information items in either of the memories due to any hardware failure, the information items stored in the other memory are read out and used. Therefore, the storage array system can eliminate the drawback that the logical system configuration information items are lost, so data recorded in the storage array system cannot be properly read out.

BRIEF DESCRIPTION OF THE DRAWINGS

FIG. 6 is a diagram for explaining the format of a parameter which is contained in the logical system configuration defining command in the embodiment;

FIG. 7 is a diagram for explaining a physical system configuration information table in the embodiment;

FIG. 8 is a diagram for explaining a logical system configuration information table in the embodiment;

FIG. 9 is a diagram for explaining the relationship between physical blocks and data arrangement in the embodiment;

PREFERRED EMBODIMENT OF THE INVENTION

Now, an embodiment of the present invention will be described by taking a disk array system as an example.

Figure 2:
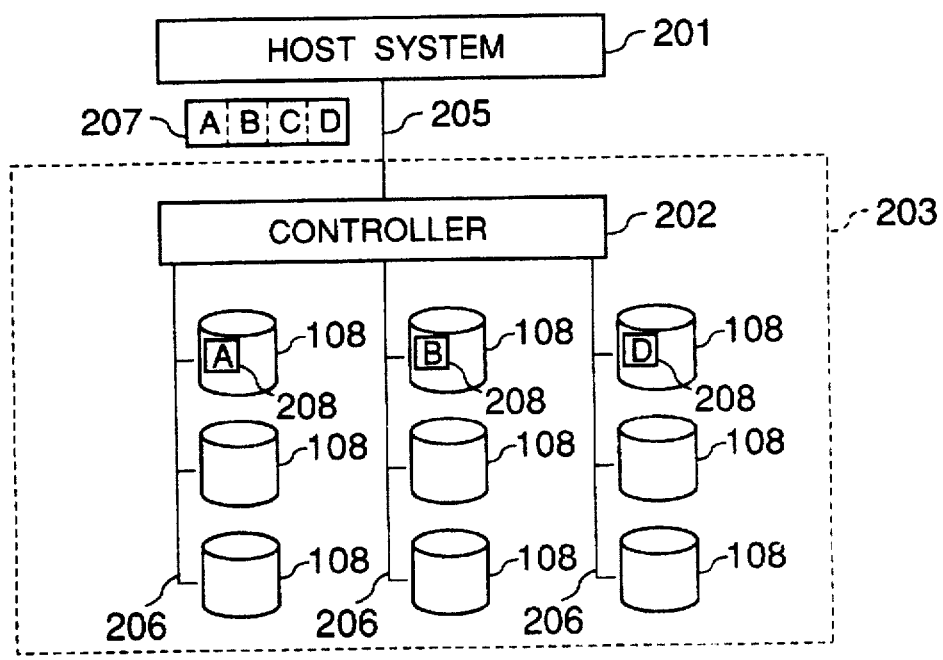
FIG. 2 is a block diagram showing an example of construction of a disk array system to which the present invention is applied.

FIG. 2 illustrates the physical configuration of the disk array system according to this embodiment, along with a host system. The disk array system 203 includes a plurality of minidisks or diskettes 108, internal buses 206, a controller 202, and a host-system interface 205. It is connected to the host system 201 by the host-system interface, such as SCSI (small computer system interface), 205. Thus, information is read out of and written into the disk array system 203. Here, data 207 to be written by the host system 201 is split into data 208 to be written into the minidisks 108, by the controller 202, whereupon the split data 208 are written into the minidisks 108. Also, the split data 208 stored in the minidisks 108 are restored by the controller 202, whereupon the restored data 207 is read out of the disk array system 203 by the host system 201. With the disk array system 203, accordingly, the operations of writing or reading the data into or from the different minidisks 108 can be simultaneously performed in parallel. This has the advantage that the data can be read or written at high speed.

FIG. 9 illustrates the relationship between physical blocks and data arrangement in more detail. As shown in the figure, each physical drive is divided into a plurality of physical blocks, and serial block numbers are given to the physical blocks of all physical drives such that they circulate through the physical drives in succession. Thus, data are stored in such a manner that the head data is stored in the first block 909 of the first drive (physical block) 901, that the next data is stored in the first block 910 of the second drive 902, and that the subsequent data is stored in the first block of the third drive 903.

Figure 3:
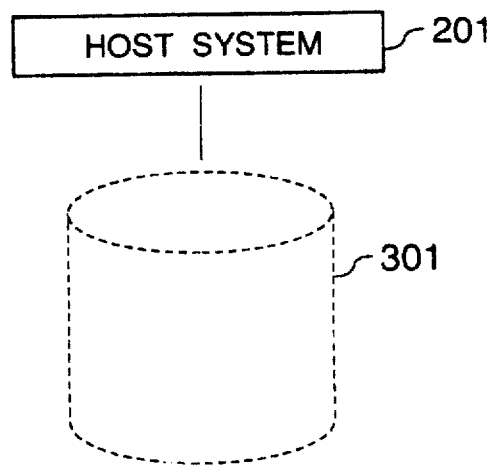
FIG. 3 is a diagram for explaining an example of logical configuration of the storage array system depicted in FIG. 1.
Figure 4:
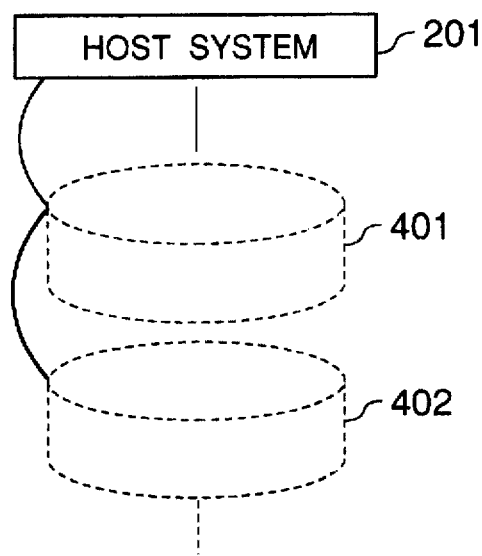
FIG. 4 is a diagram for explaining another example of logical configuration of the storage array system depicted in FIG. 1.

As illustrated in FIG. 3, accordingly, the disk array system 203 can be logically handled as a single disk system 301 of large capacity by the host system 201. The single logical disk system of large capacity 301 can also be used in the state in which it is divided into two or more logical disk devices or logical storage subsystems 401, 402, ... as shown in FIG. 4. In this regard, a logical system configuration needs to be set for the storage array system 203 as stated above, which includes the plurality of storage devices or minidisks 108 and in which the plurality of logical devices or storage subsystems 401 etc. in the configuration different from the physical configuration are apparently connected when viewed from the host system 201.

Next, the setting of the logical system configuration (the configuration of the logical storage subsystems) will be elucidated. The logical system configuration may be set by any of various methods, e. g., a method in which the disk array system 203 is endowed with the function of setting the logical system configuration in offline fashion. By way of example, here will be explained a method in which a command for defining the logical system configuration is offered to the host system 201 and in which the disk array system 203 receives logical system configuration information as a parameter of the command.

Figure 11A:
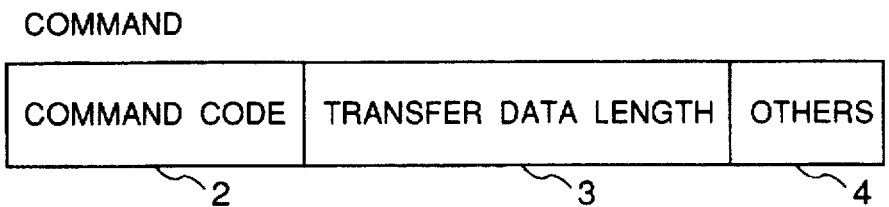
FIGS. 11A and 11B are diagrams for explaining the formats of the command and data which are sent from a host system in the embodiment, respectively.
Figure 11B:
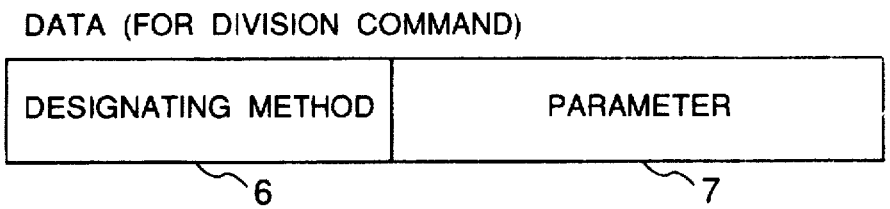

FIGS. 11A and 11B exemplify the formats of the command and the parameter which are transferred from the host system 201 to the disk array system 203. As shown in FIG. 11A, the command is composed of a command code part 2 which indicates the sort of the ordinary command for "write" or "read" and the command for "logical system configuration definition", a data length part 3 which designates the length of data to be transferred, and a part 4 which contains other collateral information. On the other hand, as shown in FIG. 11B, a parameter (data) of a division command is composed of a designating method part 6 which expresses one of a plurality of division designating methods to be stated later, and a parameter part 7 which contains parameter information of the designating method.

Figure 1:
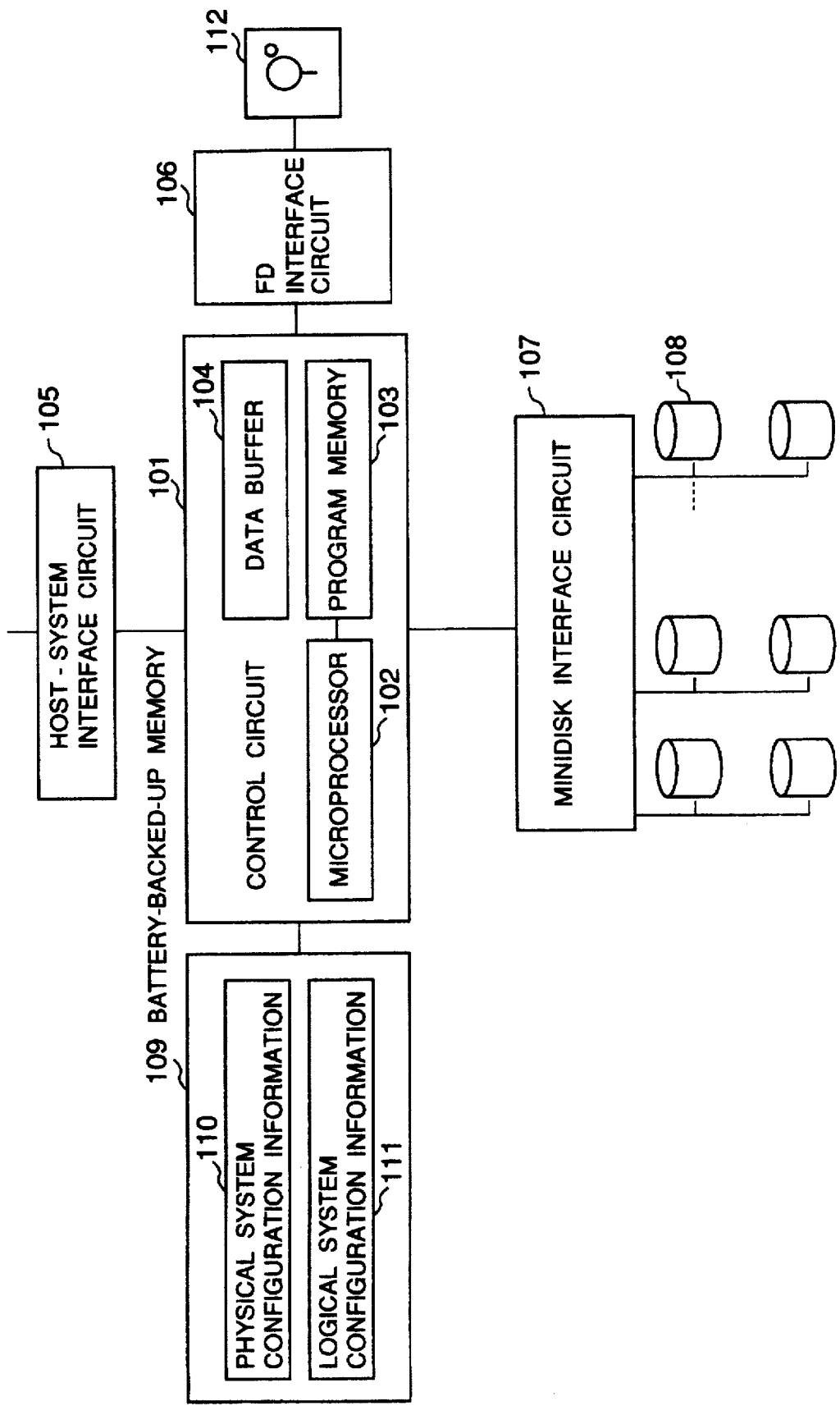
FIG. 1 is a block diagram showing the construction of a storage array system according to an embodiment of the present invention.

FIG. 1 illustrates the detailed construction of the controller 202 depicted in FIG. 2. Referring to FIG. 1, a control circuit 101 constitutes a microprocessor 102, a memory 103 for storing programs, and a data buffer 104, and it controls the whole disk array system. Under the instructions of the control circuit 101, a host-system interface circuit 105 communicates commands and data between this control circuit and the host system 201. A battery-backed-up memory 109 stores therein a physical system configuration information table 110 and a logical system configuration information table 111 in the system of this embodiment. In addition, a minidisk or diskette interface circuit 107 communicates data between the control circuit 101 and the minidisks or diskettes 108 on the basis of the instructions of this control circuit. An FD (floppy disk) interface circuit 106 and a floppy disk 112 will be explained later.

Next, the operation of the disk array system 203 responsive to the logical system configuration defining command issued by the host system 201 will be described in detail. After the start-up of the disk array system 203, the control circuit 101 starts the host-system interface circuit 105, which waits for the issue of a command by the host system 201. When the command is issued by the host system 201, the host-system interface circuit 105 receives the command and delivers it to the control circuit 101. The control circuit 101 receives the command, and analyzes the command code thereof. Upon recognizing that the received command is the logical system configuration defining command, the control circuit 101 delivers the command and the parameter information thereof to the program of a logical system configuration defining process (to be described later with reference to FIG. 5).

FIG. 6 illustrates the contents of the parameter which is delivered from the host system 201 to the control circuit 101 when the command is the logical system configuration defining command. As shown in the figure, the parameter given by the host system 201 along with the logical system configuration defining command has a field 601 which indicates the "designating method" for the definition of the logical system configuration (namely, the configuration of the logical storage subsystems). The content of the field 601 is set in the designating method part 6 in FIG. 11B stated before. The designating method for the logical configuration definition is one of the "designation of a physical size", "designation of division into n equal parts", "designation of a divisional allotment ratio" and "designation of physical boundary-based division". Fields succeeding the "designating method" field 601 are set in the parameter part 7 in FIG. 11B, and they differ depending upon the contents of the designating method. More specifically, the "physical size designation" 601a of the field 601 signifies the designating method in which the number of a logical device (namely, logical storage subsystem) denoted by numeral 602 and the physical size 603 thereof are specified. The "n-equal-part designation" 601b (n being an integer of at least 2) signifies the designating method in which only the number of divided parts (a divisional number) denoted by numeral 604 is specified. According to this designating method 601b, the total physical storage capacity of the disk array system 203 can be equally divided for the logical devices in the divisional number n merely by specifying this divisional number without the necessity of specifying the physical sizes of the respective logical devices. The "divisional allotment rate designation" 601c signifies the designating method in which the number of divided parts denoted by numeral 605, the allotment ratio value or rate 606 of the first logical device, the allotment rate 607 of the second logical device, the allotment rate 608 of the third logical device, ... are specified. According to this designating method 601c, the storage capacity rates of the respective logical devices to be occupied in the whole system 203 can be designated, for example, in such a manner that, when the divisional number n is 3, the allotment rates of the first, second and third logical devices are respectively set at "2", "1" and "3". Further, the "physical boundary-based division designation" 601d signifies the designating method in which the number of divided parts denoted by numeral 609, the first physical boundary position 610, the second physical boundary position 611, the third physical boundary position 612, ... are specified. According to this designating method 601d, the respective physical boundary positions for the division can be directly designated in physical storage unit, that is, on the basis of the individual physical storage devices or minidisks.

FIG. 7 illustrates the format of the physical system configuration information table 110 which is stored in the battery-backed-up memory 109. The information items of the physical configuration of the disk array system 203 are set when this system is assembled or when the number of magnetic disks is increased. The table 110 contains the fields of the number of connected magnetic disks denoted by numeral 701, the number of magnetic disk columns denoted by numeral 702, the number of magnetic disks per column denoted by numeral 703, the storage capacity 704 of each magnetic disk, and the total physical storage capacity 705 of the disk array system 203. Incidentally, the word "columns" indicates the array of the groups of magnetic disks connected by the corresponding internal buses 206 as shown in FIG. 2.

FIG. 8 illustrates the format of the logical system configuration information table 111. The information items of the logical configuration of the disk array system 203 are set by the logical system configuration defining command usually when this system is installed. The table 111 contains information as to each of the logical devices or logical storage subsystems, the fields of a storage capacity 801 of the logical device, a start drive No. thereof denoted by numeral 802, a start logical block No. thereof denoted by numeral 803, an end drive No. thereof denoted by numeral 804, and an end logical block No. thereof denoted by numeral 805.

Figure 5:
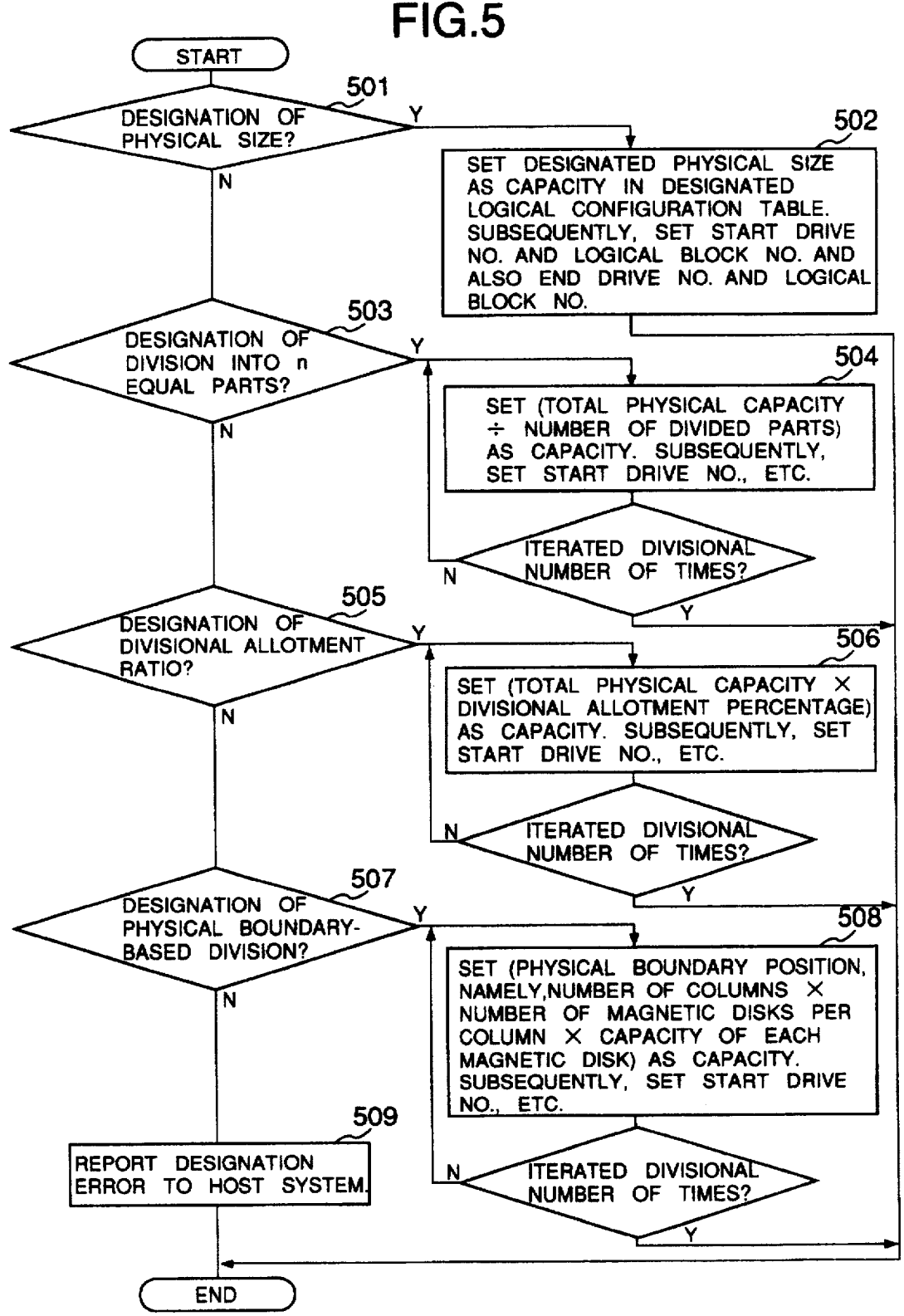
FIG. 5 is a flow chart of the processing of a logical system configuration defining command in the embodiment.

FIG. 5 is a flow chart of the process for the logical system configuration defining command. In this process, the content of the designating method field 6 in the parameter or data of the division command shown in FIG. 11B is referred to (step 501). When the designating method is the "physical size designation", a step 502 proceeds as follows: The content of the physical size 603 (FIG. 6) is set in the capacity field 801 among the fields which correspond to the pertinent logical device No. in the logical device configuration information table 111 (FIG. 8). Subsequently, the start drive No. at numeral 802 in the table 111, the start logical block No. at numeral 803, the end drive No. at numeral 804, and the end logical block No. at numeral 805 are calculated and set.

Next, when the designating method is the "n-equal-part designation" (step 503), a step 504 proceeds as follows: The content of the total physical capacity field 705 in the physical system configuration information table 110 (FIG. 7) is fetched and is divided by the divisional number at numeral 604 (FIG. 6), whereupon the resulting quotient is set in the capacity field 801 in the logical system configuration information table 111 (FIG. 8). Subsequently, the start drive No. at numeral 802 in the table 111, the start logical block No. at numeral 803, the end drive No. at numeral 804, and the end logical block No. at numeral 805 are calculated and set. Incidentally, the operations of this step 504 are iterated the number of times indicated in the divisional number field 604.

Here, in case where a remainder has developed in the operation of dividing the content of the total physical capacity field 705 of the physical system configuration information table 110 by the divisional number at numeral 604, the resulting quotient is set in the capacity field 801 of the logical system configuration information table 111 with the remaining capacity discarded. With the processing of the step 504 in FIG. 5, all the storage capacities of the divided parts or logical devices become equal, and the area of the remaining capacity is not assigned to any of the logical devices and is designated as an invalid area. Alternatively, the remaining capacity may be included in the last divided logical device.

In addition, when the designating method is the "divisional allotment rate designation" (step 505), the routine proceeds to a step 506. Here in the "divisional allotment rate designation", in case of allotting 10% of the total physical capacity to the first logical device or logical storage subsystem and the remaining capacity to the second logical device by way of example, "2" is specified for the divisional number at numeral 605, and "1", "9" and "0's" are respectively specified as the allotment rate 606 of the first logical device, the allotment rate 607 of the second logical device and the allotment rates 608, ... of the third logical device, et seq. At the step 506, therefore, the content of the total physical capacity field 705 is fetched and is multiplied by the allotment rate or percentage, thereby obtaining the storage capacity value of the pertinent logical device. The obtained value is set in the capacity field 801 of the pertinent logical device in the logical system configuration information table 111. Subsequently, likewise to the foregoing, the start drive No. at numeral 802 in the table 111, the start logical block No. at numeral 803, the end drive No. at numeral 804, and the end logical block No. at numeral 805 are calculated and set. Incidentally, the operations of this step 506 are iterated the number of times indicated in the divisional number field 605.

Lastly, unless the designating method is the "physical boundary-based division designation" (step 507), the designation error of the "designating method" is reported to the host system 201 (step 509). When the designating method is the "physical boundary-based division designation", the step 507 is followed by a step 508. Here, the "physical boundary-based division designation" signifies that the disk array system 203 is divided in magnetic disk column units in the configuration shown in FIG. 2. This division is advantageous for a multiplex operation because a single magnetic disk is not divided for a plurality of logical devices or logical storage subsystems. At the step 508, accordingly, in case of assigning two columns to the first logical device and one column to the second logical device, by way of example, "2" is set as the divisional number at numeral 609, and "2", "1" and "0's" are respectively set in the first physical boundary position field 610, the second physical boundary position field 611 and the third physical boundary position field 612, et seq. In this case, the product among the content of the first physical boundary position field 610, the number of magnetic disks per column as contained in the field 703 and the storage capacity of each magnetic disk as contained in the field 704 is set in the capacity field 801 of the logical system configuration information table 111. Subsequently, likewise to the foregoing, the start drive No. at numeral 802 in the table 111, the start logical block No. at numeral 803, the end drive No. at numeral 804, and the end logical block No. at numeral 805 are calculated and set. Incidentally, the operations of this step 508 are iterated the number of times indicated in the divisional number field 609.

The foregoing methods of the "physical size designation", "n-equal-part designation" and "divisional allotment rate designation" have been exemplified as dividing the disk array system 203 in the direction in which the physical drives are traversed. It is also possible, however, to divide the disk array system 203 in physical drive units instead of the transverse division or in addition thereto. In the case of the division in physical drive units, the rate of transfer of data to the host system 201 is inferior to the data transfer rate in the case of the transverse division, but the multiplex operation performance of the system 203 is enhanced because each physical drive can operate without being affected by the other physical drives.

Incidentally, although the four designating methods are illustrated in FIG. 6, the present invention need not comprise all of these designating methods.

Figure 10:
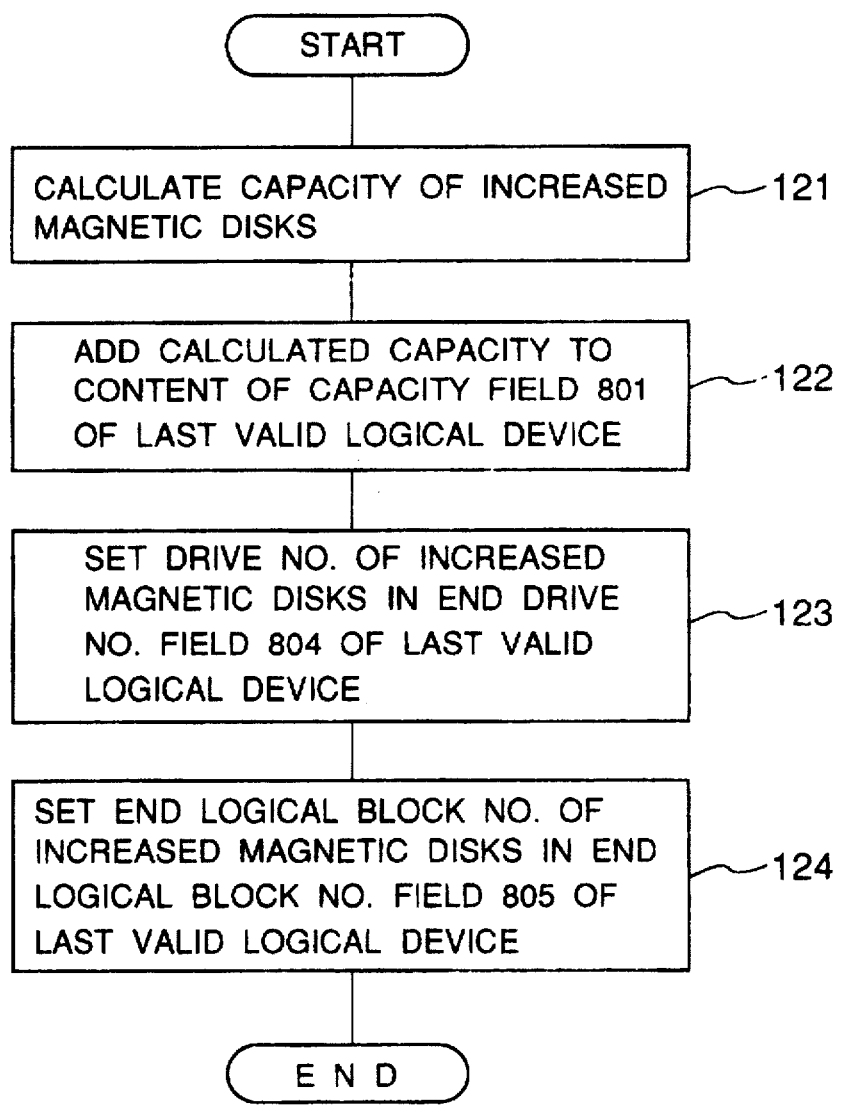
FIG. 10 is a flow chart of a process for automatically updating table contents at the expansion of a disk system in the embodiment.

The above is the outline of the operation of the disk array system 203 in the case where the logical system configuration defining command has been accepted from the host system 201. Meanwhile, in order to facilitate the setting of the logical system configuration information items, this embodiment is further endowed with a function of automatically setting the logical system configuration information items when the number of magnetic disks is increased. The flow of a updating process of this function is illustrated in FIG. 10.

First, when the number of magnetic disks 108 is increased, the storage capacity of the increased magnetic disks is calculated, and the contents of the physical system configuration information table 110 (FIG. 7) are updated (step 121). Subsequently, in order to update the contents of the logical system configuration information table 111 (FIG. 8), the calculated capacity of the increased magnetic disks is added to the content of the capacity field 801 of the last valid logical device or logical storage subsystem (step 122). Next, the drive No. of the increased magnetic disks is set in the end drive No. field 804 of the last valid logical device (step 123). Finally, the end logical block No. of the increased magnetic disks is set in the end logical block No. field 805 of the last valid logical device (step 124). Incidentally, it is needless to say that, upon increase of the number of magnetic disks 108, the logical system configuration can be reset by any of the foregoing setting methods without resorting to the automatic setting function.

The logical system configuration information items set by any of the methods explained above are recorded in the logical system configuration information table 111 retained in the battery-backed-up memory 109. The information items are used in order to obtain the physical addresses of the magnetic disks 108 from logical addresses specified by the host system 201 when these magnetic disks are to be accessed. Accordingly, when the information items have been lost, the magnetic disks 108 cannot be accessed. In general, important information items are retained in dual fashion, and an identical hardware element needs to be dualized in consideration of the failure thereof. In this embodiment, the dualization of the hardware element is replaced with an expedient in which the logical system configuration information items recorded in the battery-backed-up memory 109 are also written into the floppy disk 112 through the FD interface circuit 106 as illustrated in FIG. 1. Alternatively, an area may be reserved in any of the magnetic disks 108 instead of the floppy disk 112 so as to record the information items therein.

Incidentally, although the disk array system employing the magnetic disks as the storages has been exemplified in the above embodiment, the storage array system of the present invention can be similarly realized even when different storage media are employed.

The present invention brings forth the effect that an operator can set the logical system (logical storage subsystem) configuration of a storage array system without being conscious of the physical sizes of logical storage subsystems, so the logical system configuration can be set with ease.

Moreover, the information items of the logical system configuration are stored in different hardware elements in dual fashion, whereby these information items can be prevented from being lost due to a hardware failure, the loss making it impossible to read out data recorded in the storage array system.

What is claimed is:

1. A storage system, connected to a host system, having a plurality of physical storage devices configured in a configuration and a plurality of logical subsystems configured in a configuration different from the configuration of said plurality of physical storage devices, said storage system comprising:

means for storing therein a physical configuration information table wherein information of the configuration of said plurality of physical storage devices is maintained;

division designation means for effecting at least one of a number of designations in response to a command issued by said host system, said command is issued by said host system in response to an user input requesting a specific designation without regard to the configuration of said physical storage devices, said designations including:

a n-equal-part designation in which a total storage capacity of said physical storage devices is equally divided by n (n being an integer of at least 2) for n logical storage subsystems, a divisional allotment rate designation in which said total storage capacity is divided in accordance with a specified number for division and specified rates of capacities to be allotted to respective logical storage subsystems formed by said division, and a physical boundary division designation in which said total storage capacity is divided in accordance with specified boundary positions; and means for storing therein a logical configuration information table wherein information of said configuration of said plurality of logical storage subsystems is maintained.

2. The storage system of claim 1 wherein said means for storing a physical configuration information table and said means for storing a logical configuration information table include a memory powered by a battery.

3. The storage system of claim 2 further comprising a nonvolatile memory in addition to said battery-powered memory, wherein said physical configuration information table and said logical configuration information table are also stored in said additional nonvolatile memory.

4. The storage system of claim 1 further comprising table updating means for updating said physical configuration information table and said logical configuration information table, when at least one additional physical storage device is added to said plurality of physical storage devices for which the logical configuration information has been settled, and as a result of said updating automatically incorporating said at least one additional physical storage device into said configuration of the existing logical storage subsystems.

5. The storage system of claim 1 wherein said plurality of physical storage devices are magnetic disks, each of said magnetic disks includes a plurality of physical blocks, the plurality of magnetic disks are arranged in rows and columns, serial drive numbers are given to the respective magnetic disks, and serial block numbers are given to the physical blocks of said magnetic disks in a way such that the serial block numbers circulate through said magnetic disks in succession.

6. The storage array system of claim 5 wherein said information on the configuration of said plurality of physical storage devices includes a total number of said magnetic disks, a number of said columns of said magnetic disks, a number of said magnetic disks per column, a capacity of each of said magnetic disks, and a total capacity of said physical storage devices therein, while said logical configuration information includes the capacity, start drive number, start block number, end drive number, and end block number of each of said plurality of logical storage subsystems.

7. A storage system connected to a host system, comprising:

a plurality of physical storage devices configured in a configuration;

means for receiving a designation of a divisional number n (n being an integer of at least 2) from said host system, said designation is issued from said host system in response to an user input requesting a specific designation without regard to the configuration of said physical storage devices;

division means for equally dividing a total storage capacity of said plurality of physical storage devices by said divisional number n for n logical storage subsystems configured in a configuration that is different from said configuration of said plurality of said physical storage devices; and retention means for retaining information items indicating corresponding relationships between said configuration of said plurality of physical storage devices and said configuration of said plurality of logical storage subsystems, and said information items being referred to when said n logical storage subsystems are accessed from said host system.

8. The storage system of claim 7 wherein said division means divides each of said plurality of physical storage devices by said divisional numbers.

9. The storage system of claim 7 wherein said plurality of physical storage devices include an array of storage disks.

10. The storage system of claim 7 wherein said retention means includes a battery powered memory.

11. A storage system connected to a host system comprising:

a plurality of physical storage devices configured in a configuration;

means for receiving a designation of a divisional number n (n being an integer of at least 2) from said host system and rates of capacities to be allotted to respective logical storage subsystems of n logical storage subsystems configured in a configuration that is different from the configuration of said physical storage devices, said designation is issued from said host system in response to an user input requesting a specific designation without regard to the configuration of said physical storage devices;

division means for dividing a total storage capacity of said plurality of physical storage devices for said n logical storage subsystems based on the configuration of said plurality of physical storage devices and in accordance with the divisional number n and the allotment rates; and retention means for retaining information items indicating corresponding relationships between said configuration of said plurality of physical storage devices and said configuration of said plurality of logical storage subsystems, and said information items being referred to when said n logical storage subsystems formed are accessed from said host system.

12. The storage system of claim 11 wherein said division means divides each of said plurality of physical storage devices in said divisional number.

13. The storage system of claim 11 wherein said plurality of physical storage devices include an array of storage disks.

14. The storage system of claim 11 wherein said retention means includes a battery powered memory.

15. A storage system connected to a host system, comprising:

a plurality of physical storage devices configured in a configuration;

means for receiving a designation of a divisional number n (n being an integer of at least 2) from said host system, said designation is issued from said host system in response to an user input requesting a specific designation without regard to the configuration of said physical storage devices;

division means for dividing a total storage capacity of said plurality of physical storage devices for n logical subsystems on the basis of said configuration of said plurality of physical storage devices and in accordance with the designated divisional number n and designated boundary positions, said n logical subsystems having a configuration that is different from the configuration of said plurality of physical storage devices; and retention means for retaining information items indicating corresponding relationships between said configuration of said plurality of physical storage devices and said plurality of logical storage subsystems, and said information items being referred to when said n logical storage subsystems are accessed from said host system.

16. The storage system of claim 15 wherein said plurality of physical storage devices include an array of storage disks.

17. The storage system of claim 15 wherein said retention means includes a battery powered memory.

18. A storage array system having a plurality of physical storage devices in which a host system recognizes the physical storage devices as a plurality of logical storage devices configured in a configuration different from a configuration of plurality of physical storage devices, comprising:

means for receiving, from said host system, one of a first designation of a divisional number n (n being an integer of at least 2) in which a total storage capacity of said physical storage devices is divided by n for n logical storage devices, a second designation of said divisional number n along with specified rates of capacities to be allotted to respective logical storage devices formed by said division, and a third designation of said divisional number n along with specified boundary positions of respective logical storage devices formed by said division, said designation is issued from said host system in response to an user input requesting a specific designation without regard to the configuration of said physical storage devices;

means for dividing said plurality of physical storage devices into n logical storage devices based on the configuration of said physical storage devices, such that in response to said first designation, said total storage capacity of said physical storage devices is equally divided by said divisional number n into n logical storage devices, in response to said second designation, said total storage capacity of said physical storage devices is divided into n logical storage device according to said divisional number n and said specified rates, and in response to said third designation, said total storage capacity of said physical storage devices is divided into n logical storage devices according to said divisional number n and said specified boundary positions; and means for storing information indicative of a relationship between said plurality of physical storage devices and said plurality of logical storage devices, said information being referred to when said host system accesses one of said n logical storage devices obtained by said division.

19. A storage system according to claim 18, further comprising:

updating means for updating said information, when at least one additional physical storage device is added to said plurality of physical storage devices, and as a result of said updating automatically incorporating said at least one additional physical storage device into said configuration of the existing logical storage devices.

20. A storage system according to claim 18, wherein said means for storing information includes a memory powered by a battery.

21. A storage system according to claim 20, further comprising:

a non-volatile memory in addition to said battery-powered memory, wherein said information is also stored in said additional non-volatile memory.

* * * * *